US012171322B2

(12) United States Patent
Kibe et al.

(10) Patent No.: US 12,171,322 B2
(45) Date of Patent: Dec. 24, 2024

(54) HAIR HOLDER AND HAIR TREATMENT METHOD USING SAME

(71) Applicant: KAO CORPORATION, Tokyo (JP)

(72) Inventors: Yoshiyuki Kibe, Utsunomiya (JP); Takehiko Tojo, Utsunomiya (JP)

(73) Assignee: KAO CORPORATION, Tokyo (JP)

( * ) Notice: Subject to any disclaimer, the term of this patent is extended or adjusted under 35 U.S.C. 154(b) by 417 days.

(21) Appl. No.: 17/438,061

(22) PCT Filed: Mar. 13, 2019

(86) PCT No.: PCT/JP2019/010395
§ 371 (c)(1),
(2) Date: Sep. 10, 2021

(87) PCT Pub. No.: WO2020/183677
PCT Pub. Date: Sep. 17, 2020

(65) Prior Publication Data
US 2022/0248826 A1    Aug. 11, 2022

(51) Int. Cl.
*A45D 7/04*    (2006.01)
*A45D 2/18*    (2006.01)

(52) U.S. Cl.
CPC .............. *A45D 7/045* (2013.01); *A45D 2/18* (2013.01)

(58) Field of Classification Search
CPC ........ A45D 7/045; A45D 2/18; A45D 19/018; A45D 7/04; G01N 2021/7796; G01N 21/78
See application file for complete search history.

(56) References Cited

U.S. PATENT DOCUMENTS 3,255,765 A    6/1966 Sturdivant
4,028,118 A *  6/1977 Nakasuji .............. C08K 5/0041
                                              428/199
(Continued)

FOREIGN PATENT DOCUMENTS

CN    101500533 A    8/2009
CN    101616655 A    12/2009
(Continued)

OTHER PUBLICATIONS

Machine Translation of JP 2016-116866 A. (Year: 2016).*
(Continued)

*Primary Examiner* — Brian Handville
(74) *Attorney, Agent, or Firm* — Birch, Stewart, Kolasch & Birch, LLP

(57) ABSTRACT

A hair holder (1) of the present invention has a tubular body (2) which has: a first opening (21) located at one end; and a second opening (22) located at the other end, and which is configured to allow a lock of hair (H) to be inserted from the first opening (21) toward the second opening (22) and to be capable of being rolled up. The tubular body (2) has a longitudinal direction and a width direction that is orthogonal to the longitudinal direction. The tubular body (2) has two sheets that form outer surfaces. At least one of the two sheets is formed of a color-changeable sheet that satisfies conditions (1) and (2) below: (1) an L* value in an L*a*b* color coordinate space is 90 or less; and (2) a color difference $\Delta E^{*}_{ab}$ value in the L*a*b* color coordinate space between before and after impregnation with a standard hair treatment agent is 1.0 or greater. The standard hair treatment agent contains ammonium thioglycolate in an amount of 6 mass %, ammonium hydrogencarbonate in an amount of 2 mass %, and disodium edetate in an amount of 0.5 mass %, the balance being water, and the standard hair treatment (Continued)

agent is adjusted to a pH of 8.4 at 20° C. using a 28 mass % aqueous solution of ammonia.

20 Claims, 4 Drawing Sheets

(56) References Cited

U.S. PATENT DOCUMENTS

| | | | | |
|---|---|---|---|---|
| 4,681,791 A * | 7/1987 | Shibahashi | ............ | D06P 1/004 |
| | | | | 428/196 |
| 5,153,066 A * | 10/1992 | Tanaka | ............ | D01F 8/04 |
| | | | | 428/906.6 |
| 6,012,464 A * | 1/2000 | Hollowell | ............ | A45D 7/045 |
| | | | | 132/202 |
| 7,022,331 B2 * | 4/2006 | Theisen | ............ | A61Q 19/04 |
| | | | | 514/71 |
| 2008/0075681 A1 | 3/2008 | Cassier et al. | | |
| 2008/0302381 A1 | 12/2008 | Tojo et al. | | |
| 2010/0111885 A1 | 5/2010 | Shibata et al. | | |
| 2017/0056308 A1 * | 3/2017 | Ito | ............ | A45D 2/38 |

FOREIGN PATENT DOCUMENTS

| | | |
|---|---|---|
| JP | 61-148203 U | 9/1986 |
| JP | 61-198601 U | 12/1986 |
| JP | 62-8707 A | 1/1987 |
| JP | 2005-168957 A | 6/2005 |
| JP | 2005-185532 A | 7/2005 |
| JP | 2005-324073 A | 11/2005 |
| JP | 2006-129972 A | 5/2006 |
| JP | 2007-130199 A | 5/2007 |
| JP | 2011-147730 A | 8/2011 |
| JP | 2016-116866 A | 6/2016 |
| WO | WO 2007/032235 A1 | 3/2007 |

OTHER PUBLICATIONS

Extended European Search Report for European Application No. 19919203.0, dated Sep. 22, 2022.

International Search Report, issued in PCT/JP2019/010395, PCT/ISA/210, dated Jun. 18, 2019.

* cited by examiner

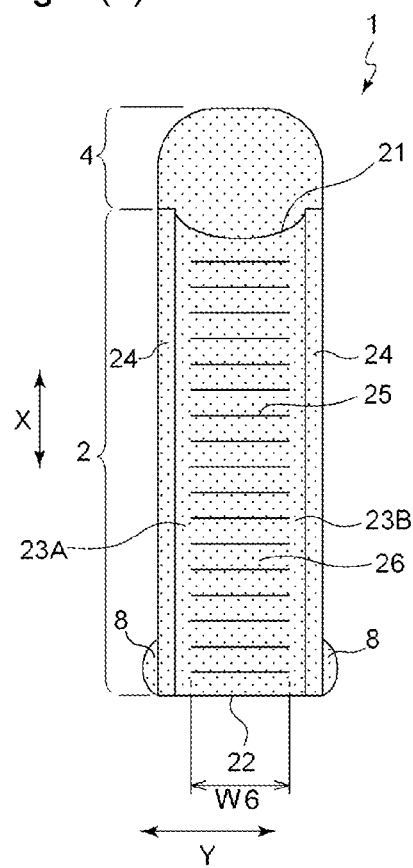
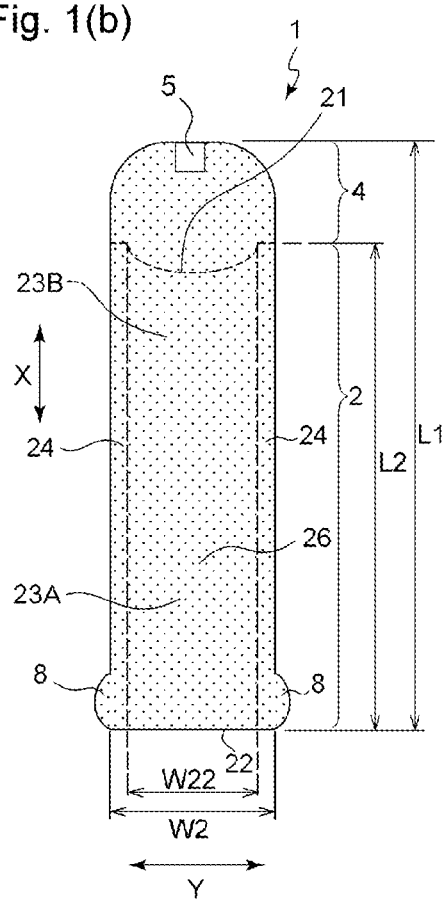

Fig. 2
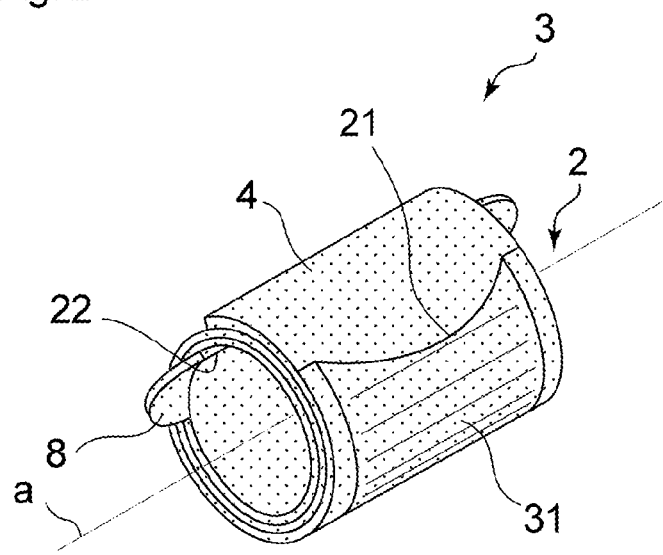
Fig. 3
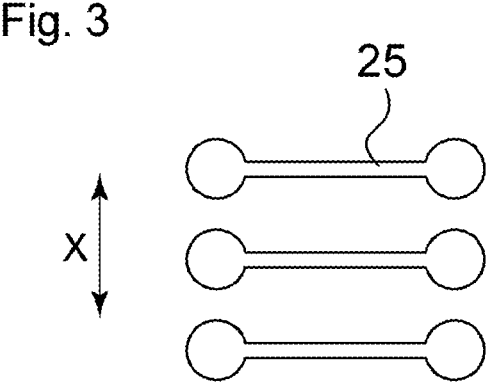
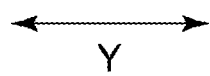

HAIR HOLDER AND HAIR TREATMENT METHOD USING SAME

TECHNICAL FIELD

The present invention relates to a hair holder and a hair treatment method using the hair holder.

BACKGROUND ART

As a hair holder used in a curling treatment for imparting a curled shape to a lock of hair, a hair holder is known that has a tubular body configured such that, after a lock of hair is inserted into the tubular body, the tubular body can be rolled up together with the lock of hair. For example, Patent Literature 1 discloses a hair holder having a pocket portion into which a lock of hair can be inserted from an insertion opening toward an exit opening located at the opposite end.

In a curling treatment that uses a hair holder including a tubular body that can be rolled up, there are cases where a hair treatment agent such as a permanent wave agent is applied to an outer circumferential portion of the tubular body that has been rolled up into a roll shape, allowed to permeate into the tubular body, and thereby applied to a lock of hair held in the tubular body. From the viewpoint of facilitating the permeation of the hair treatment agent into the tubular body, the applicant of the present invention has previously proposed a hair holder having a tubular body constituted by two sheets, wherein the basis weights of the two sheets are gradually reduced in one direction (Patent Literature 2). From the viewpoint of reliably applying a hair treatment agent to a lock of hair held in a hair holder, Patent Literature 3 discloses a perming rod in which a material that can be discolored by a hair treatment agent coating or permeating that material is used.

As a hair holder having a configuration different from those of the above-described tubular bodies, the applicant of the present invention has previously proposed a hair holder having a tubular body, wherein the tubular body can be rolled up by pulling a rolling-up string, and thereby a lock of hair held in the tubular body can be deformed into a spiral shape (Patent Literature 4). This hair holder includes a first hair holder with which a lock of hair can be deformed into a clockwise spiral shape and a second hair holder with which a lock of hair can be deformed into a counterclockwise spiral shape. In Patent Literature 4, there is a description to the effect that these two types of hair holders are partially colored with different colors in order to distinguish between the two types of hair holders.

CITATION LIST

Patent Literature

Patent Literature 1: U.S. Pat. No. 3,255,765A
Patent Literature 2: JP 2005-185532A
Patent Literature 3: JP 2016-116866A
Patent Literature 4: JP 2011-147730A

SUMMARY OF INVENTION

The present invention relates to a hair holder including a tubular body which has: a first opening located at one end; and a second opening located at the other end, and which is configured to allow a lock of hair to be inserted from the first opening toward the second opening and to be capable of being rolled up, the tubular body having a longitudinal direction and a width direction that is orthogonal to the longitudinal direction. The tubular body has two sheets that form outer surfaces. At least one of the two sheets is formed of a color-changeable sheet that satisfies conditions (1) and (2) below:

(1) an L* value in an L*a*b* color coordinate space is 90 or less; and
(2) a color difference $\Delta E^*_{ab}$ value in the L*a*b* color coordinate space between before and after impregnation with a standard hair treatment agent is 1.0 or greater, the standard hair treatment agent containing ammonium thioglycolate in an amount of 6 mass %, ammonium hydrogencarbonate in an amount of 2 mass %, and disodium edetate in an amount of 0.5 mass %, the balance being water, and the standard hair treatment agent being adjusted to a pH of 8.4 at 20° C. using a 28 mass % aqueous solution of ammonia.

Also, the present invention relates to a hair treatment method using the hair holder. The hair treatment method of the present invention includes: an insertion step of inserting the lock of hair into the tubular body; a rolling up step of rolling up the tubular body together with the lock of hair inserted in the tubular body, thereby forming a lock-of-hair holding body in which the lock of hair is held in a deformed state; and a curling treatment step of performing a curling treatment on the lock of hair by supplying a hair treatment agent to the lock-of-hair holding body. In addition, in the curling treatment step of the hair treatment method of the present invention, the supply of the hair treatment agent is performed while checking a visual change occurring in the color-changeable sheet.

BRIEF DESCRIPTION OF DRAWINGS

FIGS. 1(a) and 1(b) are a front view and a rear view, respectively, showing an embodiment of a hair holder of the present invention.

FIG. 2 is a perspective view showing a lock-of-hair holding body of the hair holder shown in FIGS. 1(a) and 1(b).

FIG. 3 is an enlarged plan view showing another embodiment of slits shown in FIG. 1(a).

DESCRIPTION OF EMBODIMENTS

Figure 4A:
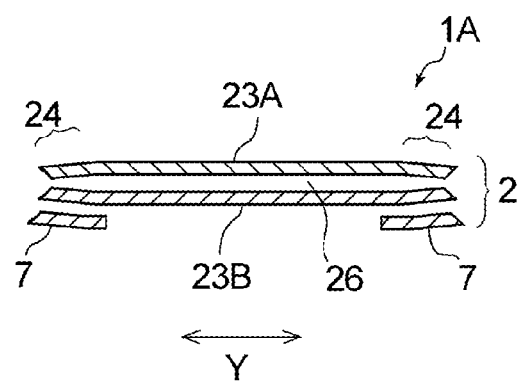
FIGS. 4(a) and 4(b) are schematic diagrams each showing a cross section of a hair holder that has a reinforcement material, taken along a width direction thereof.

In a treatment for imparting a particular shape to a lock of hair using a hair holder, it is important in improving the finish to reliably apply a hair treatment agent to the lock of hair held in the tubular body. For this purpose, it is desirable that whether or not the hair treatment agent has permeated into the tubular body and thereby has been applied to the lock of hair held in the tubular body can be checked. Patent Literatures 1, 2, and 4 do not disclose a technology that can check the permeation of the hair treatment agent into the tubular body. With the perming rod disclosed in Patent Literature 3, permeation of the hair treatment agent can be checked based on color-change of a constituent member of the perming rod. However, if the color of the entire perming rod has been changed, it is difficult to distinguish between the constituent member before the color-change and the constituent member after the color-change.

Therefore, the present invention provides a hair holder that can eliminate the above-described drawbacks of related art, and a hair treatment method using the hair holder.

Hereinafter, a hair holder of the present invention will be described based on preferred embodiments thereof, with reference to the drawings. Preferably, the hair holder of the present invention is used to perform a curling treatment for curling a lock of hair. "Curling" refers to imparting a particular shape, such as a curled shape or a spiral shape, to a lock of hair. The hair holder of the present invention is mainly used to perform a treatment on human head hair.

FIGS. 1(a) and 1(b) show an embodiment of the hair holder of the present invention. A hair holder 1 shown in FIGS. 1(a) and 1(b) includes a tubular body 2 into which a lock of hair H can be inserted from a first opening 21 located at one end toward a second opening 22 located at the other end. Specifically, the tubular body 2 includes two sheets 23A and 23B that are elongated in one direction, and has a flat shape. The two sheets 23A and 23B are laid one on top of the other. The two sheets serve as a first surface sheet 23A, that is located on the inside of the tubular body 2 when the tubular body 2 is rolled up, and a second surface sheet 23B, that is located on the outside of the tubular body 2 when the tubular body 2 is rolled up. The two sheets 23A and 23B form outer surfaces of the tubular body 2. The outer surfaces of the tubular body 2 constitute surfaces of the hair holder that are located opposite to surfaces that form a space into which a lock of hair can be inserted. Also, the tubular body 2 has a pair of side joint portions 24 where the first surface sheet 23A and the second surface sheet 23B are joined to each other. A tubular portion 26 that is located between the pair of side joint portions 24. Each of the two side joint portions 24 is formed by joining side edge portions of the two sheets 23A and 23B to each other. The side edge portions extend along the extending direction of the two sheets. The tubular portion 26 has, between the first opening 21 and the second opening 22 in a longitudinal direction X, a space into which the lock of hair H can be inserted. In the present embodiment, the side joint portions 24 are formed through fusion bonding, such as heat sealing.

The tubular body 2 of the present embodiment has the longitudinal direction X and a width direction Y that is orthogonal to the longitudinal direction X. The longitudinal direction X of the tubular body 2 is the same as the extending direction of the tubular portion 26 and corresponds to the direction in which the lock of hair H is inserted.

Opposite side edge portions of the tubular body 2, that extend along the longitudinal direction X, may be parallel to each other as shown in the present embodiment; however, the opposite side edge portions do not need to be parallel to each other. In that case, it is preferable that the opposite side edge portions extend gradually outward in the width direction Y from the first opening 21 toward the second opening 22. In other words, it is preferable that, in a plan view, the tubular body 2 has a shape that widens toward the second opening 22.

The tubular body 2 is configured to be capable of being rolled up. Being configured to be capable of being rolled up means that the tubular body 2 can be wound into a roll shape as shown in FIG. 2. Such configuration is preferably a configuration in which the tubular body 2 automatically rolls up. Such configuration may also be a configuration in which the tubular body 2 is manually rolled up. An example of the automatic rolling-up configuration is a configuration in which the tubular body 2 is wound in a roll shape in its natural state, and after stretching out the tubular body 2 and inserting a lock of hair H therein, the tubular body 2 rolls up together with the lock of hair H upon being released from the stretched state. Such a configuration can be realized by either or both of the two sheets 23A and 23B, which constitute the tubular body 2, being made of a shape-memory sheet that has preliminarily retained the state in which the hair holder 1 is rolled up. The shape-memory sheet can be formed by bonding together films having different heat shrinkage rates or films having different tensions. Moreover, the tubular body 2 may also return to its retained original roll shape when the sheets 23A and 23B constituting the tubular body 2 are heated.

The hair holder is configured such that, after a lock of hair is inserted into the tubular body from the first opening toward the second opening, the tubular body is rolled up together with the lock of hair and thus deformed into a roll shape. In the following description, the tubular body that has been rolled up into a roll shape will also be referred to as a lock-of-hair holding body 3. In the lock-of-hair holding body 3, the second opening is located nearer to the center of the roll that has been rolled up. The center is on the central axis a of the roll-shaped lock-of-hair holding body 3. In the following description, the center of the lock-of-hair holding body will also be referred to simply as the "center". The lock-of-hair holding body has a spiral shape in a cross section taken in a radial direction that is orthogonal to the direction of the central axis.

The hair holder 1 of the present embodiment has an extended portion 4 on the first opening 21 side of the tubular body 2, the extended portion 4 being formed of the first surface sheet 23A extending outward in the longitudinal direction X from the tubular body 2. The extended portion 4 is integrally formed with the first surface sheet 23A. Although the hair holder does not need to have the extended portion, it is preferable that the hair holder has the extended portion, from the viewpoint of making it easy to insert a lock of hair into the tubular body. In the case where the hair holder has the extended portion, the hair holder 1 may have, on the first surface sheet 23A, an extended portion 4 as a sheet that is separate from the first surface sheet 23A, or may have an extended portion 4 that is continuous with the first surface sheet 23A.

The hair holder 1 of the present embodiment keeps the tubular body 2 in the rolled-up state as shown in FIG. 2 and is thereby used to perform a curling treatment on the lock of hair H. In the hair holder 1, when the tubular body 2 is rolled up into the lock-of-hair holding body 3, the outer surface of the first surface sheet 23A and the outer surface of the second surface sheet 23B partially face each other. More specifically, in the lock-of-hair holding body 3, or in other words, in the tubular body 2 in the wound state, the outer surface of a portion of the first surface sheet 23A that is located on the first opening 21 side in the longitudinal direction X and constitutes an outer circumferential portion 31 faces the outer surface of a portion of the second surface sheet 23B that constitutes a wound portion that is adjacent to the outer circumferential portion 31. The outer circumferential portion 31 is a wound portion that is the farthest from the central axis a, and has the largest roll diameter, in the tubular body 2 in the wound state, or in other words, in the lock-of-hair holding body 3. Then, a fixing member 5 engages with a portion of the outer surface of the second surface sheet 23B, and thus, the tubular body 2 is kept in the rolled-up state, or in other words, a roll shape. Moreover, the lock of hair H held in the tubular body 2 is also kept in a roll shape. In the present embodiment, the outer circumferential portion 31 is a wound portion of the tubular body 2 and does not contain the extended portion 4.

With the hair holder 1, the tubular body 2 into which the lock of hair H is inserted is rolled up and deformed into the roll-shaped lock-of-hair holding body 3, and then, a hair treatment agent such as a permanent wave agent is supplied to the surface of the outer circumferential portion 31 of the lock-of-hair holding body 3, to thereby apply the hair treatment agent to the lock of hair H. Thus, the hair holder 1 can impart a curled shape to the lock of hair H.

In the tubular body 2, at least one of the two sheets, namely, the first surface sheet 23A and the second surface sheet 23B, that form the tubular body 2 is formed of a color-changeable sheet, which means that the color of the sheet may be changed, that satisfies conditions (1) and (2) below:
  (1) the L* value in the L*a*b* color coordinate space is 90 or less; and
  (2) the color difference $\Delta E^*_{ab}$ value in the L*a*b* color coordinate space between before and after impregnation with a standard hair treatment agent is 1.0 or greater.

The above-described L* value is a value before the impregnation of the tubular body with a standard hair treatment agent, which will be described later.

In the case where, as in the hair holder 1 of the present embodiment, the tubular body 2 has the first surface sheet 23A and the second surface sheet 23B as the two sheets that form the outer surfaces thereof. The first surface sheet 23A is located on the inside of the tubular body 2 when the tubular body 2 is rolled up. The second surface sheet 23B is located on the outside of the tubular body 2 when the tubular body 2 is rolled up. It is preferable that, of the two sheets, only the second surface sheet 23B, which is located on the outside when the tubular body 2 is rolled up, is formed of the above-described color-changeable sheet. In the same case, it is also preferable that both of the sheets 23A and 23B are formed of the above-described color-changeable sheet. That is to say, it is preferable that at least the second surface sheet 23B, which is located on the outside when the tubular body is rolled up, is formed of the above-described color-changeable sheet among the first surface sheet 23A, that is located on the inside of the tubular body when the tubular body is rolled up, and the second surface sheet 23B, that is located on the outside of the tubular body when the tubular body is rolled up.

The hair holder 1 of the present invention may also be configured such that, during the rolling-up, which of the two sheets that form the outer surfaces of the tubular body 2 is located on the outside of the tubular body 2 when the tubular body 2 is rolled up is not fixed. In that case, it is preferable to roll up the tubular body 2 such that the sheet formed of the color-changeable sheet is located on the outside when the tubular body 2 is rolled up.

The L*a*b* color coordinate space is the CIE 1976 (L*a*b*) color space, which is a uniform color space. The coordinate values of the L*a*b* color coordinate space represent lightness L* and chromaticity coordinates a* and b*. With regard to the L* value, which represents lightness, 100 indicates white, and 0 indicates black. Colors indicated by L* values of 90 or less include some of colors that can be visually perceived as white colors such as milk white, silver white, white lead, and titanium white and whitish colors such as ivory.

The above-described color difference $\Delta E^*_{ab}$ value is represented by a color difference formula [1] below. In the color difference formula [1], a* indicates a substantially red direction, a* indicates a substantially green direction, b* indicates a substantially yellow direction, and b* indicates a substantially blue direction.

[Math. 1]

$$\Delta E^*_{ab} = \sqrt{(L^*_2 - L^*_1)^2 + (a^*_2 - a^*_1)^2 + (b^*_2 - b^*_1)^2} \qquad [1]$$

L* value before impregnation with standard hair treatment agent: $L^*_1$ value
L* value after impregnation with standard hair treatment agent: $L^*_2$ value
a* value before impregnation with standard hair treatment agent: $a^*_1$ value
a* value after impregnation with standard hair treatment agent: $a^*_2$ value
b* value before impregnation with standard hair treatment agent: $b^*_1$ value
b* value after impregnation with standard hair treatment agent: $b^*_2$ value The L* value, the a* value, and the b* value of the color-changeable sheet are measured using the following method.

Method for Measuring L*, a*, and b* Values

Measurement of the L* value, the a* value, and the b* value of a color-changeable sheet is performed before and after impregnation with a standard hair treatment agent. First, a 50 mm square measurement piece is cut from a color-changeable sheet of a hair holder, and immersed in a standard hair treatment agent for 5 seconds. After that, the measurement piece is sandwiched between two sheets of paper (Kimtowel, available from Nippon Paper Crecia Co., Ltd., product number: 61000), and a load equivalent to 1 kg weight is applied thereto from above for 10 seconds. The L* value, the a* value, and the b* value of the measurement piece obtained through this operation are measured and used as an $L^*_2$ value, an $a^*_2$ value, and a $b^*_2$ value of the color-changeable sheet "after impregnation" with the standard hair treatment agent. In addition, the L* value, the a* value, and the b* value of the measurement piece prior to the above-described operation, or in other words, the measurement piece "before impregnation" with the standard hair treatment agent are measured and used as an $L^*_1$ value, an $a^*_1$ value, and a $b^*_1$ value of the color-changeable sheet "before impregnation" with the standard hair treatment agent.

For the measurement of the L* value, the a* value, and the b* value, for example, a spectrophotometer CM-700d (trade name) available from Konica Minolta Japan, Inc. can be used. As the measurement method using the above-described spectrophotometer CM-700d, the measurement is performed in a specular component excluded (SCE) mode under the measurement conditions with an illuminant of D65 and a viewing angle of 10°. The measurement is performed in the following manner: white calibration is performed using an attached white calibration cap, then, a target mask (Φ8 mm) is brought into contact with a surface of the above-described measurement piece that constitutes an outer surface of the tubular body, and the L* value, the a* value, and the b* value of the measurement piece are measured while pressing the spectrophotometer against the measurement piece so as to prevent a gap from forming between that surface and the target mask (Φ8 mm). For each of measurement pieces that are cut from arbitrary ten portions of the color-changeable sheet, this measurement is performed five times, and an average value is used as the measurement value.

The above-described standard hair treatment agent contains ammonium thioglycolate in an amount of 6 mass %, ammonium hydrogencarbonate in an amount of 2 mass %, and disodium edetate in an amount of 0.5 mass %, the balance being water, and is adjusted to a pH of 8.4 at 20° C. using a 28 mass % aqueous solution of ammonia. The standard hair treatment agent can be obtained by, for example, dissolving 12 g of ammonium thioglycolate, 4 g of ammonium hydrogencarbonate, and 1 g of disodium edetate in 100 ml of pure water, mixing the thus obtained solution with the 28 mass % aqueous solution of ammonia to thereby adjust the pH to 8.4 at 20° C., and then adding pure water to make a total volume of 200 mL.

If at least one of the two sheets, namely, the first surface sheet 23A and the second surface sheet 23B, that form the tubular body 2 is formed of the above-described color-changeable sheet, when a hair treatment agent such as a permanent wave agent is supplied to the roll-shaped lock-of-hair holding body 3, the hair treatment agent is absorbed by the color-changeable sheet and thus the color of the color-changeable sheet is changed. That is to say, the color of a portion of the color-changeable sheet, where the hair treatment agent permeates, is changed. Therefore, a user of the hair holder can easily confirm that the hair treatment agent has been applied to the lock of hair held in the tubular body 2. Moreover, based on the location and the range of the portion where the color is changed, the user can easily check whether or not the hair treatment agent has been applied to the entire lock of hair held in the tubular body 2. In other words, the user can easily check whether or not the lock of hair held in the tubular body 2 has a portion to which the hair treatment agent has not been applied, and can suitably perform the curling treatment.

In the case where the two sheets that form the tubular body 2 are formed of the color-changeable sheet, even if the color of the entire hair holder is changed, the user can easily perceive a visual change between before and after the color-change because the above-described color difference $\Delta E^*_{ab}$ of the color-changeable sheet is 1.0 or greater, and can therefore easily check whether or not the hair treatment agent has permeated.

Note that the composition of the hair treatment agent used in the hair treatment method using the hair holder of the present invention may be the same as or different from the composition of the above-described standard hair treatment agent.

From the viewpoint of even more reliably achieving the above-described effects, the color difference $\Delta E^*_{ab}$ value of the color-changeable sheet in the L*a*b* color coordinate space between before and after impregnation with the standard hair treatment agent is preferably 1.0 or greater, more preferably 1.3 or greater, and even more preferably 2.0 or greater, is preferably 90.0 or less, more preferably 15.0 or less, and even more preferably 10.0 or less, and is preferably from 1.0 to 90.0, more preferably from 1.3 to 15.0, and even more preferably from 2.0 to 10.0.

From the viewpoint of reducing the influence of the lighting environment and enabling the user to even more easily perceive a visual change in the color-changeable sheet, the absolute value of a lightness difference $\Delta L^*$ value of the color-changeable sheet is preferably 1.0 or greater, and more preferably 2.0 or greater, is preferably 90.0 or less, and more preferably 10.0 or less, and is preferably from 1.0 to 90.0, more preferably from 2.0 to 10.0, and even more preferably from 2.0 to 5.0, the lightness difference $\Delta L^*$ value being obtained by subtracting an $L^*_1$ value in the L*a*b* color coordinate space before impregnation with a standard hair treatment agent from an $L^*_2$ value in the L*a*b* color coordinate space after impregnation with the standard hair treatment agent. The above-described lightness difference $\Delta L^*$ value is represented by a formula [2] below. In the formula [2] below, the $L^*_1$ value is an L* value of the color-changeable sheet before impregnation with the standard hair treatment agent, and the $L^*_2$ value is an L* value of the color-changeable sheet after impregnation with the standard hair treatment agent.

$$\Delta L^* = L^*_2 - L^*_1 \quad [2]$$

In the case where the curling treatment is performed on relatively pale hair such as blond hair, an effect of making the visual change in the color-changeable sheet between before and after discoloration thereof even more noticeable in contrast to the color of the hair can be achieved by the color-changeable sheet after impregnation with the hair treatment agent having, for example, a color darker than the hair. From the viewpoint of increasing the difference between the color of the hair to be treated and the color of the color-changeable sheet after impregnation with the hair treatment agent in order to achieve the above-described effect, the above-described lightness difference $\Delta L^*$ value of the color-changeable sheet is preferably −10.0 or greater, and more preferably −5.0 or greater, is preferably −1.0 or less, and more preferably −2.0 or less, and is preferably from −10.0 to −1.0, and more preferably from −5.0 to −2.0. Examples of the above-described "relatively pale hair" include white hair; blond hair, chestnut hair, red hair, and the like that are often found in Caucasoids, Australoids, or the like; and dyed or bleached hair.

In the case where the curling treatment is performed on relatively pale hair such as blond hair, the above-described effect can also be achieved by the color-changeable sheet after impregnation with the hair treatment agent having a bluish color, for example. From a similar viewpoint to that described above, the above-described color difference $\Delta b^*$ value of the color-changeable sheet is preferably −50 or greater, and more preferably −10 or greater, is preferably less than 0, and more preferably −0.5 or less, and is preferably −50 or greater and less than 0, and more preferably from −10 to −0.5.

In the case where the curling treatment is performed on relatively dark hair such as black hair, the effect of making the visual change in the color-changeable sheet between before and after color-change even more noticeable in contrast to the color of the hair can be achieved by the color-changeable sheet after impregnation with the hair treatment agent having a yellowish color, for example. From the viewpoint of increasing the difference between the color of the hair to be treated and the color of the color-changeable sheet after impregnation with the hair treatment agent in order to achieve the above-described effect, the color difference $\Delta b^*$ value of the color-changeable sheet is preferably 1.0 or greater, and more preferably 1.5 or greater, is preferably 50.0 or less, and more preferably 10.0 or less, and is preferably from 1.0 to 50.0, and more preferably from 1.5 to 10.0, the color difference $\Delta b^*$ value being obtained by subtracting a $b^*_1$ value in the L*a*b* color coordinate space before impregnation with a standard hair treatment agent from a $b^*_2$ value in the L*a*b* color coordinate space after impregnation with the standard hair treatment agent. The above-described color difference $\Delta b^*$ value is represented by a formula [3] below. In the formula [3] below, the $b^*_1$ value is a b* value of the color-changeable sheet before impregnation with the standard hair treatment agent, and the $b^*_2$ value is a b* value of the color-changeable sheet before impregnation with the standard hair treatment agent.

$$\Delta b^* = b^*_2 - b^*_1 \quad [3]$$

The above-described "relatively dark hair" refers to hair that assumes a black color, and examples of such hair include black hair that is often found in Mongoloids, Negroids, or the like; and dyed hair.

Preliminary washing or the like of the hair may be performed prior to the curling treatment. If the surface of the hair has become wet with water prior to the application of the hair treatment agent, the color-changeable sheet may become wet with water by coming into contact with the hair. In the case where a lock of hair in a wet state is inserted into the tubular body, from the viewpoint of making the visual change in the color-changeable sheet even more noticeable, the color difference $\Delta E^*_{ab}$ value in the L*a*b* color coordinate space between before and after impregnation with water is preferably less than 1.0, more preferably 0.9 or less, and even more preferably 0.5 or less. The "color difference $\Delta E^*_{ab}$ value in the L*a*b* color coordinate space between before and after impregnation with water" is measured using a similar method to that described in the section "Method for Measuring L*, a*, and b* Values" above, except that the color-changeable sheet is impregnated with water, instead of the above-described standard hair treatment agent.

It is preferable that the color of the color-changeable sheet is a color other than white. The term "white" means that, when a digital image of the color-changeable sheet that is observed using a microscope (model number "VHX-5000") available from Keyence Corporation is converted to an 8-bit grayscale image using a piece of image analysis software ("Image J" developed by U.S. NIH (National Institute of Health)), and, for each pixel, the density is represented by an 8-bit signal in 256 levels, from 0 to 255, the signals are within the range of level 240 to level 255. That is to say, the "color other than white" refers to a color outside the above-described range of level 240 to level 255. Examples of the color of the color-changeable sheet include chromatic colors such as black, gold, yellow, brown, silver, gray, pale crimson, crimson, yellow-green, dark blue, and dark gray. The color of the color-changeable sheet is preferably black, gold, yellow, brown, silver, gray, pale crimson, crimson, yellow-green, dark blue, or dark gray, more preferably black, gold, yellow, silver, gray, pale crimson, crimson, yellow-green, dark blue, or dark gray, and even more preferably black, gold, yellow, silver, dark blue, or dark gray, because these colors are less likely to produce a visual change due to impregnation with water and make the visual change due to impregnation with the hair treatment agent even more noticeable. The color of the color-changeable sheet here refers to the color "before impregnation" with the above-described standard hair treatment agent, and is a color within a range that appears to be any of the aforementioned colors to the eye. For example, black is a color within a range that can be visually perceived as black, and includes black colors, as well as blackish colors such as grayish brown and black green. Also, the aforementioned gold and silver are colors with a metallic luster, and are therefore differentiated from the aforementioned yellow and gray.

There are several possible factors in color-change of the color-changeable sheet due to the supply of the hair treatment agent. As one of the factors, it is conceivable that gaps in the sheet are filled with the hair treatment agent, and thus, the index of refraction for light of the color-changeable sheet changes. The term "gaps in the sheet" means fine gaps between the raw materials of the sheet. For example, in the case where the sheet is made of a fiber material such as a nonwoven fabric, gaps between fibers are the "gaps in the sheet". It is conceivable that, in a state in which the gaps in the sheet are sufficiently filled with the hair treatment agent, or in other words, in a state in which the amount of liquid that can be absorbed by the color-changeable sheet has reached a saturated amount, the amount of change in the color of the color-changeable sheet is maximized. Slits, which will be described later, are excepted from the "gaps in the sheet"; however, this does not mean that a form that has slits is excluded from the hair holder of the present invention.

From the viewpoint of making the visual change in the color-changeable sheet even more noticeable by filling the gaps in the sheet with the hair treatment agent, it is preferable that the color-changeable sheet has at least a predetermined level of porosity in sheet. Moreover, from the viewpoint of making the visual change due to the supply of the hair treatment agent even more noticeable, it is preferable that, in the lock-of-hair holding body 3, the second surface sheet 23B has a higher porosity in sheet per unit area than the first surface sheet 23A. The porosity in sheet is measured using the following method.

Method for Measuring Porosity in Sheet

A measurement sample is cut from a sheet constituting the tubular body along a straight line parallel to a direction along the longitudinal direction of the tubular body such that the measurement sample has a length of 0.5 to 1.0 mm in a direction along the width direction of the tubular body. Then, the measurement sample is placed on a horizontally-arranged black mount, with the thickness direction of a cross section of the measurement sample matching the vertical direction. Then, a magnified photograph of a cross section of the measurement sample taken along the longitudinal direction of the tubular body is observed using a microscope (VHX-5000 available from Keyence Corporation. Image data (jpeg) of this observation field is subjected to image analysis using a piece of image analysis software (Nexus-NewQube). Specifically, an area is set with a size of 0.2 mm in the thickness direction of the measurement sample and 1 mm in a direction along the longitudinal direction of the tubular body, and binarization processing is performed on this area. In the case where the raw material of the sheet is a fiber material, and the above-described image is binarized into a black-and-white image, usually, fibers are shown as white and portions where the fibers are not present are shown as black. Then, the area ratio occupied by the raw material of the sheet in the above-described area is obtained, and this value is subtracted from 100%. The thus obtained value is used as the porosity (%) in sheet per specific area. The porosity (%) in sheet per specific area is measured at arbitrary three locations in the cross section of the measurement sample, and an average of the measurement values at these three locations is used as the porosity (%) in sheet.

From the viewpoint of making it even easier to check whether or not the hair treatment agent has permeated into the tubular body, it is also preferable that, in the case where, as in the case of the hair holder of the present embodiment, the tubular body 2 has, as the two sheets constituting the tubular body 2, the first surface sheet 23A that is located on the inside of the tubular body 2 when the tubular body 2 is rolled up and the second surface sheet 23B that is located on the outside of the tubular body 2 when the tubular body 2 is rolled up, at least the second surface sheet 23B, which is located on the outside when the tubular body 2 is rolled up, is formed of the above-described color-changeable sheet. It is also preferable that both the first and second surface sheets 23A and 23B are formed of the above-described color-changeable sheet. Each of the first and second surface sheets 23A and 23B may be formed partially or entirely of the color-changeable sheet, but is preferably formed entirely of the color-changeable sheet.

The hair holder 1 of the present embodiment has the extended portion 4 extending outward in the longitudinal direction X from the first opening 21, and, in addition to the first and second surface sheets 23A and 23B, the extended portion 4 may also be formed of the color-changeable sheet.

The hair holder 1 of the present embodiment has a fixing member 5 that maintains a state in which the tubular body is rolled up. The fixing member 5 can keep the tubular body in a roll shape. In the present embodiment, the fixing member 5 can be detachably engaged with the outer surface of the second surface sheet 23B. The fixing member 5 is provided on an outer surface of the extended portion 4 extending outward in the longitudinal direction X from the first surface sheet 23A. The fixing member 5 of the present embodiment is arranged so as to face a portion of the outer surface of the second surface sheet 23B in the roll-shaped lock-of-hair holding body 3, and is thus joined to that portion of the outer surface of the second surface sheet 23B. Thus, the hair holder 1 can be maintained in the form of the lock-of-hair holding body 3. The fixing member may be a sheet engagement member that can be partially engaged with the two sheets constituting the tubular body 2, or may be a joint member constituted by a plurality of members that can be detachably joined to each other, or a male and female member assembly. Such fixing member is provided at a position where the fixing member can maintain the tubular body as the lock-of-hair holding body 3. For example, in the case where the fixing member is the male and female member assembly, one member of the male and female member assembly is provided on the outer surface of the first surface sheet 23A or the extended portion 4, the other member of the male and female member assembly is provided on the outer surface of the second surface sheet 23B, and the tubular body 2 can be maintained as the lock-of-hair holding body 3 by the male member and the female member being joined to each other. Examples of the sheet engagement member that can be used as the fixing member include a male member of a mechanical fastener, and the like. Examples of the joint member include an adherend-selective pressure-sensitive adhesive tape, a magnet, and the like. Examples of the male and female member assembly include a hook and eye, a mechanical hook-and-loop fastener, and the like.

The adherend-selective pressure-sensitive adhesive tape is a pressure-sensitive adhesive tape that adheres only to a particular substance and substantially does not adhere to any other substances. The wording "substantially does not adhere" includes not only a case where the adherend-selective pressure-sensitive adhesive tape does not create an adhesion state with any substance other than the particular substance but also a case where, even though the adherend-selective pressure-sensitive adhesive tape creates an adhesion state with a substance other than the particular substance, the adhesion state quickly disappears if a slight relative movement occurs between that substance and the adherend-selective pressure-sensitive adhesive tape. Such adherend-selective pressure-sensitive adhesive tape includes a tape base material and a self-adhesive agent applied to the tape base material, and the self-adhesive agent adheres only to a substance of the same kind and substantially does not adhere to other substances. That is to say, the self-adhesive agent has adhesiveness only to the self-adhesive agent itself.

As an example of the adherend-selective pressure-sensitive adhesive tape having the above-described configuration, a type of pressure-sensitive adhesive tape that includes a self-adhesive agent and a tape base material and is disclosed in JP 2007-167192A can be used.

The second surface sheet has a plurality of slits that extends in the width direction Y and that is intermittently arranged along the longitudinal direction X. With this configuration, the tubular body 2 can be smoothly rolled up. In the present embodiment, the slits pass through the second surface sheet in its thickness direction.

The hair holder 1 of the present embodiment has a plurality of said slits 25 in the second surface sheet 23B, and the plurality of slits is arranged in series. In the present embodiment, all of the slits 25 have the same length in the width direction Y, but the slits may have different lengths in the width direction Y. Moreover, as shown in FIG. 3, the slits may each have circular portions at both end portions thereof. The slits shown in FIG. 3 each have, in the width direction Y, a first widthwise end portion, a second widthwise end portion and a straight portion located in the middle of the slit, and both the first and second end portions have a greater length in the longitudinal direction X than the straight portion. Both the first and second end portions of such slits may be formed in a circular shape through punching, for example.

From the viewpoint of enhancing the rolling-up force of the hair holder, it is preferable that the hair holder has reinforcement materials at positions where they overlap the pair of side joint portions 24, respectively. A reinforcement material 7 is a sheet that is arranged to enhance the rolling-up force of the tubular body 2. The length of the reinforcement material 7 in the width direction Y may be such a length that the reinforcement material 7 does not span between the pair of side joint portions 24. It is preferable that reinforcement materials 7 are arranged in both of the two side joint portions 24, respectively, of the tubular body 2 so as to extend in the longitudinal direction X.

Figure 4B:
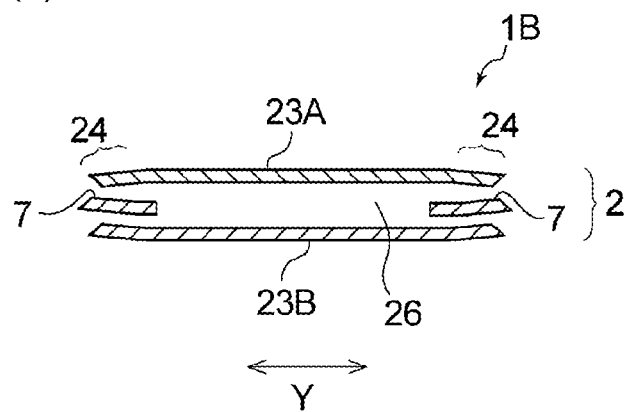

FIGS. 4(a) and 4(b) show hair holders that have reinforcement materials described above. A hair holder 1A shown in FIG. 4(a) has reinforcement materials 7 that are arranged on the outer surface of one of the two sheets 23A and 23B that constitute a tubular portion 26. From the viewpoint of enhancing the rolling-up force even more, it is preferable that the reinforcement materials 7 are arranged on the outer surface of the second surface sheet 23B. A hair holder 1B shown in FIG. 4(b) has reinforcement materials 7 that are arranged between the two sheets 23A and 23B that constitute the tubular portion 26. Note that, although the sheets that constitute the tubular body 2 are joined to each other in the side joint portions 24, a gap is shown between the sheets that constitute the tubular body 2 in FIGS. 4(a) and 4(b) for the sake of convenience of description.

As shown in FIGS. 1(a) and 1(b), the hair holder 1 of the present embodiment has winding and tightening tabs 8 on the opposite side edge portions, respectively, that extend in the longitudinal direction X of the tubular body 2, the winding and tightening tabs 8 being located in the vicinity of the second opening 22. As shown in FIG. 1(b), the winding and tightening tabs 8 are integrally formed with the first surface sheet 23A so as to extend outward in the width direction Y from the tubular body 2, and each have a semicircular shape in a plan view. Due to the hair holder having the winding and tightening tabs, the tubular body can be rolled up easily, and tightly, if necessary, by holding the winding and tightening tabs with hands and rolling up the tubular body. The winding and tightening tabs 8 may also be provided as portions extending outward in the width direction Y from either or both of the two sheets 23A and 23B that constitute the tubular body 2. Alternatively, the winding and tightening tabs 8 may be provided by connecting members that are separate from the two sheets 23A and 23B to the opposite side edge portions, respectively, of the two sheets 23A and 23B. The formation method, shape, size, thickness, arrangement, and the like of the winding and tightening tabs 8 can be set appropriately.

From the viewpoint of repeatedly using the hair holder 1, it is preferable that the discoloration of the color-changeable sheet is reversible. For example, it is preferable that the color-changeable sheet that has discolored by absorbing the hair treatment agent can return to its color before the discoloration by being washed with a washing liquid such as water and then dried.

The dimensions and the like of the tubular body 2 can be appropriately determined in accordance with the length of hair, the section of hair that is desired to be curled, and the volume of a lock of hair to be inserted, but are preferably within the following ranges.

The length W2 (see FIG. 1(b)) of the tubular body 2 in the width direction Y is preferably 25 mm or greater, and more preferably 30 mm or greater, is preferably 200 mm or less, and more preferably 150 mm or less, and is preferably from 25 to 200 mm, and more preferably from 30 to 150 mm.

The length L1 (see FIG. 1(b)) of the hair holder 1 in the longitudinal direction X is preferably 50 mm or greater, and more preferably 100 mm or greater, is preferably 400 mm or less, and more preferably 350 mm or less, and is preferably from 50 to 400 mm, and more preferably from 100 to 350 mm. The length L1 of the hair holder 1 in the longitudinal direction X is the sum of the lengths of the extended portion 4 and the tubular body 2 in the longitudinal direction X.

The length L2 (see FIG. 1(b)) of the tubular body 2 in the longitudinal direction X is preferably 45 mm or greater, and more preferably 90 mm or greater, is preferably 300 mm or less, and more preferably 275 mm or less, and is preferably from 45 to 300 mm, and more preferably from 90 to 275 mm. An end portion of the tubular body 2 of the present embodiment on the side of the first opening 21 is curved into a concave shape curving inward in the longitudinal direction X. In the case where the length of the tubular body 2 in the longitudinal direction X varies depending on the position in the width direction Y in this manner, it is preferable that the maximum length of the tubular body 2 in the longitudinal direction X is within the aforementioned range.

The length W22 (see FIG. 1(b)) of the second opening 22 in the width direction Y relative to the length W2 (see FIG. 1(b)) of the tubular body 2 in the width direction Y is preferably 40.0% or greater, and more preferably 66.7% or greater, is preferably 97.5% or less, and more preferably 96.7% or less, and is preferably from 40.0% to 97.5%, and more preferably from 66.7% to 96.7%.

The length W22 (see FIG. 1(b)) of the second opening 22 in the width direction Y is preferably 10 mm or greater, and more preferably 20 mm or greater, is preferably 195 mm or less, and more preferably 145 mm or less, and is preferably from 10 to 195 mm, and more preferably from 20 to 145 mm.

In the present embodiment, the length W22 of the second opening 22 in the width direction Y is equal to the length of the first opening 21 in the width direction Y. The length of the second opening 22 in the width direction Y and the length of the first opening 21 in the width direction Y may be equal to each other or may be different from each other.

Here, the slits 25 extending in the width direction of the second surface sheet 23B means slits with a slit width of less than 3 mm. In addition, the length W6 (see FIG. 1(a)) of the slits 25 in the width direction Y relative to the length W2 of the tubular body 2 in the width direction Y is preferably 40.0% or greater, and more preferably 50.0% or greater, is preferably 90.0% or less, and more preferably 80.0% or less, and is preferably from 40.0% to 90.0%, and more preferably from 50.0% to 80.0%.

Moreover, the length W6 (see FIG. 1(a)) of the slits 25 in the width direction Y is preferably 10 mm or greater, and more preferably 15 mm or greater, is preferably 180 mm or less, and more preferably 120 mm or less, and is preferably from 10 to 180 mm, and more preferably from 15 to 120 mm.

A method for performing a curling treatment using the hair holder of the present embodiment will be described. Hereinafter, the method for performing a curling treatment will also be referred to as a hair treatment method of the present embodiment.

Figure 5A:
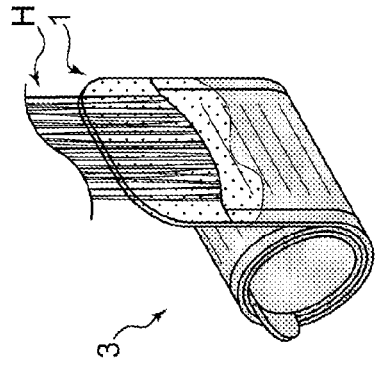
FIGS. 5(a) to 5(c) show explanatory diagrams sequentially illustrating procedures for performing a curling treatment using the hair holder shown in FIGS. 1(a) and 1(b).
Figure 5B:
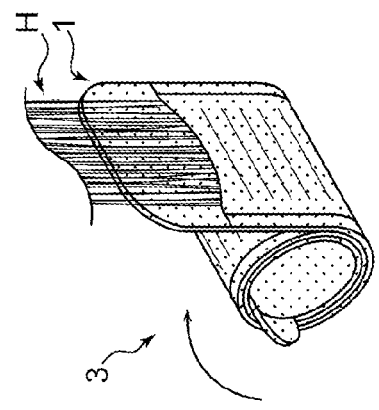
Figure 5C:
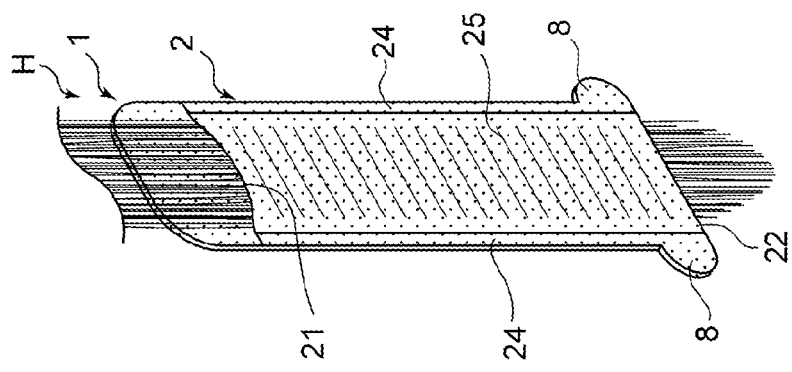

As illustrated in FIGS. 5(a) to 5(c), the hair treatment method of the present invention includes: a step of inserting a lock of hair H into the tubular body 2; a step of rolling up the tubular body 2 together with the lock of hair H inserted in the tubular body 2, thereby forming the lock-of-hair holding body 3 for curling in which the lock of hair H is held in a deformed state; and a step of performing a curling treatment on the lock of hair H by supplying a hair treatment agent to the lock-of-hair holding body 3.

In the following description, the step of inserting a lock of hair H into the tubular body 2 will also be referred to as an insertion step, the step of forming the lock-of-hair holding body 3 as a rolling-up step, and the step of performing a curling treatment on the lock of hair H as a curling treatment step.

In the insertion step, as illustrated in FIG. 5(a), a lock of hair H is inserted between the two sheets 23A and 23B that constitute the tubular body 2 from the first opening 21 toward the second opening 22 of the tubular body 2. Thus, in the tubular body 2, a root portion of the lock of hair H is located on the side of the first opening 21, and a hair tip portion of the lock of hair H is located on the side of the second opening 22. The operation of inserting the lock of hair H at the insertion step may be performed using an operator's hands, or may be performed using an elongated hair insertion tool for inserting a lock of hair H into the tubular body 2. An example of the hair insertion tool is a hair insertion tool having a locking portion that can lock the lock of hair H and an elongated, insertion tool main body that has a predetermined length. More specifically, in the hair insertion tool, the insertion tool main body is formed into an elongated plate-like shape, and an end portion thereof has a tapered shape so as to be easily inserted into the first opening of the tubular body 2. Preferably, the insertion tool main body is made of a hard synthetic resin sheet or the like. The locking portion is provided at one end of the insertion tool main body, formed into a ring shape that is longer than it is wide, and a lock of hair can be inserted through, and thus locked in, this ring.

In this step, it is sufficient that the lock of hair can be inserted into the tubular body, and the lock of hair does not need to pass through the tubular portion 26. In other words, a leading end of the lock of hair does not need to protrude from the second opening of the tubular body.

In the rolling-up step, the tubular body 2 is rolled up together with the lock of hair inserted in the tubular body 2 to form the lock-of-hair holding body. In this rolling-up step, as illustrated in FIG. 5(b), the tubular body 2 is rolled up from the second opening 22 toward the first opening 21 along the longitudinal direction X. That is to say, the tubular body 2 is rolled up so that the second opening 22 is positioned on the center side of the lock-of-hair holding body 3 that is roll-shaped. Accordingly, a hair tip portion of the lock of hair H is located on the center side of the lock-of-hair holding body, and a root portion thereof is located on the outer circumferential portion side of the lock-of-hair holding body. In this step, the lock-of-hair holding body may be formed by the aforementioned configuration in which the tubular body 2 automatically rolls up, or may be formed by the aforementioned configuration in which the tubular body 2 is manually rolled up. It is also possible that, after the tubular body 2 has been rolled up using the automatic rolling-up configuration, the roll diameter of lock-of-hair holding body may be adjusted by further manually performing a winding and tightening operation or an unwinding operation. Thus, the roll diameter of the lock of hair H held in the tubular body 2 can be adjusted. The hair holder 1 of the present embodiment has the winding and tightening tabs 8 on the side of the second opening 22 in the longitudinal direction X, and the winding and tightening operation or the unwinding operation of the tubular body 2 can be performed by holding the winding and tightening tabs 8.

In the curling treatment step, while the tubular body 2 is maintained in the form of the lock-of-hair holding body 3, the hair treatment agent is supplied to the lock-of-hair holding body 3, or more specifically, the lock of hair H in the tubular body of the lock-of-hair holding body 3, and a curling treatment is thereby performed. The tubular body 2 is maintained in the form of the roll-shaped lock-of-hair holding body 3 by the above-described fixing member 5. The curling treatment is a treatment for imparting a particular shape to a lock of hair, and, as the curling treatment, after the hair treatment agent is supplied, a treatment in which the hair holder is allowed to stand for a predetermined period of time, a treatment in which the tubular body is heated, or the like is performed.

In the curling treatment step, when applying the hair treatment agent to the lock-of-hair holding body 3, or more specifically, the lock of hair H in the tubular body of the lock-of-hair holding body 3, the hair treatment agent may be injected into the tubular body 2 from the slits 25, or may be injected into the outer surface of either one of the two sheets 23A and 23B that constitute the tubular body 2 and then allowed to permeate that sheet. Thus, the hair treatment agent is supplied to the lock of hair H held in the tubular body 2.

In the curling treatment step, it is preferable to supply the hair treatment agent to the lock-of-hair holding body 3 while visually checking a color change occurring in the color-changeable sheet that forms one or both of the outer surfaces of the tubular body 2. It is easy to supply an appropriate amount of hair treatment agent to an appropriate area by supplying the hair treatment agent while checking a visual change occurring in the color-changeable sheet. For example, it is possible to confirm that the hair treatment agent has sufficiently spread over the area that is to be curled, or to prevent dripping due to the supply an excessive amount of hair treatment agent.

When supplying the hair treatment agent, for example, as shown in FIG. 5(c), it is preferable to supply the hair treatment agent until a visual change occurs in the color-changeable sheet. An operator who performs the hair treatment method can easily check whether the hair treatment agent has been applied to the lock of hair held in the tubular body 2, and whether or not the hair treatment agent has spread throughout the lock of hair, by perceiving a visual change in the color-changeable sheet.

In the hair holder 1 of the present embodiment, the two sheets 23A and 23B that constitute the tubular body 2 are formed of the color-changeable sheet, and it is preferable that the hair treatment agent is supplied until a visual change occurs in either or both of the two sheets 23A and 23B. In this case, for example, the hair treatment agent is supplied until a visual change occurs in the outer surface of the second surface sheet 23B that forms a surface of the outer circumferential portion 31 of the lock-of-hair holding body 3, the outer surface of the first surface sheet 23A that forms a space on the central axis side of the lock-of-hair holding body 3, or the like. In this case, it is sufficient that the hair treatment agent is supplied until a visual change occurs in a portion of, or the entirety of, the two sheets 23A and 23B that constitute the tubular body 2, and there is no particular limitation on the area of a region where the visual change occurs. From the viewpoint of even more reliably supplying the hair treatment agent to the lock of hair, it is preferable that the hair treatment agent is supplied until a visual change occurs in a portion of, or the entirety of, the tubular portion 26 of the two sheets 23A and 23B.

The above-described visual change includes: a color change from a certain color to another color due to the absorption of the hair treatment agent by the color-changeable sheet; a change in a figure or the like, or more specifically, a particular figure, character, symbol, or pattern, a combination of these, or the like coming to stand out as a result of the color change; and the like. A visual change other than a color change is enabled to occur by performing embossing, which will be described later, or the like on the color-changeable sheet.

There is no particular limitation on the hair treatment agent, and any hair treatment agents, such as a commercially available permanent wave agent, can be used. In general, the permanent wave agent includes a first agent that contains a reductant, such as a thioglycolate or cysteine, and a second agent that contains an oxidant, such as a bromate or hydrogen peroxide.

The composition of the hair treatment agent used in the curling treatment step may be the same as, or different from, the composition of the above-described standard hair treatment agent.

From the viewpoint of making it even easier to perceive a visual change in the color-changeable sheet, it is preferable that the hair treatment agent contains the following components.

From the viewpoint of making it easy to perceive a visual change in the color-changeable sheet, it is preferable that the hair treatment agent is a visually colorless, or colored, transparent liquid. The term "colored" above includes white.

It is preferable that the hair treatment agent contains a reducing agent. Examples of the reducing agent include: thioglycolic acid, thioglycolic acid derivatives, and salts thereof; thiolactic acid, thiolactic acid derivatives, and salts thereof; cysteine, cysteine derivatives, and salts thereof; as well as thioglyceryl alkyl ethers, mercaptoalkylamides, sulfites, bisulfite, and the like. One of these compounds may be used alone, or two or more thereof may be used in combination. In particular, it is preferable to use at least one compound selected from the group consisting of thioglycolic acid, thioglycolic acid derivatives, and salts thereof; thiolactic acid, thiolactic acid derivatives, and salts thereof; and cysteine, cysteine derivatives, and salts thereof.

The amount of the reducing agent contained in the hair treatment agent is preferably 1 mass % or greater, and more preferably 2 mass % or greater, is preferably 20 mass % or less, and more preferably 10 mass % or less, and is preferably from 1 to 20 mass %, and more preferably from 2 to 10 mass %.

It is preferable that the hair treatment agent contains an alkali agent. Examples of the alkali agent include: ammonia and salts thereof, alkanolamines, such as monoethanolamine, isopropanolamine, 2-amino-2-methylpropanol, and 2-aminobutanol, and salts thereof; alkanediamines, such as 1,3-propanediamine, and salts thereof, and carbonates, such as guanidine carbonate, sodium carbonate, potassium carbonate, sodium hydrogencarbonate, and potassium hydrogencarbonate. In particular, ammonia and salts thereof are preferable. One of these compounds may be used alone, or two or more thereof may be used in combination. Examples of the above-described ammonia and salts thereof include ammonium hydrogencarbonate and ammonium chloride.

The amount of the alkali agent contained in the hair treatment agent is preferably 0.1 mass % or greater, and more preferably 1 mass % or greater, is preferably 10 mass % or less, and more preferably 5 mass % or less, and is preferably from 0.1 to 10 mass %, and more preferably from 1 to 5 mass %.

The curling treatment step is completed by removing the lock of hair H from the tubular body 2. The lock of hair removed from the tubular body has a curl shape, for example. After the curling treatment step, the lock of hair that has been curled may be subjected to a post-treatment, if necessary. As the post-treatment, washing hair, drying hair using a drying means such as a dryer, applying a hair treatment agent to hair, and other treatments can be performed alone or in a combination of two or more. Examples of the hair treatment agent that may be used in the post-treatment include a hair conditioning agent, a pre-hair-conditioning agent, a styling agent, a hair tonic agent, a hair restoration and hair growth agent, and the like.

According to the hair treatment method of the present embodiment, the lock of hair may be partially curled, or the lock of hair may be entirely curled. In the case where the lock of hair is to be partially curled, a portion between roots and hair ends of the lock of hair, or more specifically, for example, a root portion, a hair tip portion that contains hair ends, or an intermediate portion between the root portion and the hair tip portion may be curled.

Now, materials for forming the various portions of the hair holder will be described.

At least one of the first and second surface sheets that constitute the tubular body is formed of a color-changeable sheet. The color-changeable sheet can be produced by adding a color material to a sheet material. Examples of the method for adding the color material to the sheet material include: a method in which the sheet material is impregnated with a solution containing the color material; a method in which the color material is kneaded into a resin that constitutes the sheet material; and a method in which the color material is applied to one surface of the sheet material. A known coating apparatus or printing apparatus can be used to perform the method in which the color material is applied to one surface of the sheet material. As the sheet material, a nonwoven fabric (a polyethylene nonwoven fabric, a polyethylene terephthalate nonwoven fabric, or the like), a woven fabric, a net-like sheet, a porous or non-porous resin film (a polyethylene film, a polyethylene terephthalate film, or the like), paper, a polymer material sheet, a rubber sheet, a composite of two or more of these materials, or the like may be used. As the color material, an acid-base indicator, such as litmus or bromothymol blue, a dye, a pigment, or the like may be used. From the viewpoint of making it easy to judge whether or not a visual change due to the supply of the hair treatment agent has occurred, and from the viewpoint of repeatedly using the hair holder, it is preferable to use either or both of the dye and the pigment as the color material. In the case where a sheet material other than the color-changeable sheet is used as a sheet material used in the hair holder, as this sheet material, a nonwoven fabric (a polyethylene nonwoven fabric, a polyethylene terephthalate nonwoven fabric, or the like), a woven fabric, a net-like sheet, a porous or non-porous resin film (a polyethylene film, a polyethylene terephthalate film, or the like), paper, a polymer material sheet, a rubber sheet, a composite of two or more of these materials, or the like may be used.

The thickness of the first surface sheet and the second surface sheet is preferably 5 µm or greater, and more preferably 10 µm or greater, is preferably 2000 µm or less, and more preferably 1500 µm or less, and is preferably from 5 to 2000 µm, and more preferably from 10 to 1500 µm.

Preferably, a sheet that constitutes the tubular body and includes the color-changeable sheet has undergone processing for improving the diffusivity of a hair treatment agent such as a permanent wave agent. Although there is no particular limitation on this processing, for example, a method disclosed in JP 2007-130199A may be used. Specific examples of this processing include embossing, calendering, resin film formation, and the like. For example, the embossing can improve the diffusivity by forming protrusions successively arranged in the longitudinal direction of the sheet and thereby allowing the hair treatment agent to flow along the protrusions. The calendering can improve the diffusivity of the hair treatment agent by adjusting the density of the sheet that constitutes the tubular body. The resin film formation can improve the diffusivity of the hair treatment agent by forming a resin film with low liquid absorbency partially or entirely on the sheet that constitutes the tubular body and thereby reducing the total liquid absorption amount of the sheet. In the following description, the processing for improving the diffusivity of a hair treatment agent will also be referred to as "liquid-diffusivity-imparting processing".

As described above, the hair treatment agent is supplied from the surface of the outer circumferential portion 31 of the lock-of-hair holding body 3. From the viewpoint of easily spreading the hair treatment agent throughout the lock of hair held in the tubular body, it is preferable that the second surface sheet 23B has higher liquid diffusivity than the first surface sheet 23A. A sheet that has liquid diffusivity can be obtained by, for example, performing the above-described liquid-diffusivity-imparting processing on a sheet. Although the first surface sheet 23A does not need to have liquid diffusivity, the first surface sheet 23A may have liquid diffusivity on condition that it is lower than the liquid diffusivity of the second surface sheet 23B. The second surface sheet 23B that has higher liquid diffusivity than the first surface sheet 23A can be obtained by, for example, performing the liquid-diffusivity-imparting processing on the second surface sheet 23B, but not on the first surface sheet 23A. Alternatively, the second surface sheet 23B that has higher liquid diffusivity than the first surface sheet 23A can be obtained by making the area of a portion of the second surface sheet 23B on which the liquid-diffusivity-imparting processing is performed larger than that of the first surface sheet 23A. In addition, the second surface sheet 23B that has higher liquid diffusivity than the first surface sheet 23A can be obtained by applying different pressing forces to the sheets in the embossing or the calendering, or by using resins that have different levels of liquid absorbency in the resin film formation.

From the viewpoint of even more efficiently applying the hair treatment agent to the lock of hair held in the tubular body, it is preferable that the second surface sheet 23B has higher liquid permeability than the first surface sheet 23A. In other words, it is preferable that, when compared with the first surface sheet 23A, the second surface sheet 23B allows a liquid to smoothly permeate the sheet from a surface to a rear surface thereof. For example, a method disclosed in JP 2005-319158 may be used as the method for imparting liquid permeability to a sheet. Specifically, a method in which a surface of a sheet made of a hydrophobic material is treated with a hydrophilic resin or the like, a method in which a second surface sheet made of a hydrophobic material is impregnated with a surfactant that is slightly soluble in water, or a method in which a sheet is produced by mixing a hydrophobic material and a hydrophilic material may be used. Although the first surface sheet 23A does not need to have liquid permeability, the first surface sheet 23A may have liquid permeability on condition that it is lower than the liquid permeability of the second surface sheet 23B. The second surface sheet 23B that has higher liquid permeability than the first surface sheet 23A can be obtained by producing the second surface sheet 23B using the method for imparting liquid permeability to a sheet, and producing the first surface sheet 23A without using the method for imparting liquid permeability to a sheet. Alternatively, the second surface sheet 23B that has higher liquid permeability than the first surface sheet 23A can be obtained by making the areas of portions to be surface-treated with a hydrophilic resin, the types of hydrophilic resins or surfactants that are slightly soluble in water, or the mixing ratios between a hydrophobic material and a hydrophilic material different from each other.

The liquid permeability of a sheet can also be improved by setting the capillary force of the sheet lower than the capillary force of the lock of hair. In this case, the hair treatment agent supplied to an outer surface of the tubular body is transferred into the tubular body by the capillary force of the lock of hair.

From the viewpoint of enabling the above-described change in a figure or the like to occur in the color-changeable sheet, it is preferable that the color-changeable sheet has been embossed such that a particular figure, character, symbol, or pattern, a combination of these, or the like is formed. In this case, the above-described embossing is performed on the outer surface of the first surface sheet 23A or the second surface sheet 23B for which the color-changeable sheet is used. In an embossed portion that has been formed through embossing, the hair treatment agent absorbency is weaker than that of a portion around the embossed portion, and accordingly, the degree of color change due to the absorption of the hair treatment agent differs between the embossed portion and the portion around the embossed portion. Thus, a particular figure, character, symbol, or pattern or a combination of these, which is formed by the embossed portion, can stand out.

A material that can enhance the rolling-up force of the hair holder 1 can be used for the reinforcement materials. For example, a sheet-like material may be used, such as a nonwoven fabric (a polyethylene nonwoven fabric, a polyethylene terephthalate nonwoven fabric, or the like), a woven fabric, a net-like sheet, a porous or non-porous resin film (a polyethylene film, a polyethylene terephthalate film, or the like), paper, a polymer material sheet, a rubber sheet, or a composite of two or more of these materials.

A method for producing the hair holder will be described. The tubular body of the hair holder can be formed by superposing two sheets one on top of the other and integrating side portions of the two sheets along their longitudinal direction. Alternatively, the tubular body of the hair holder can be formed by folding a single sheet into a rectangular shape in a plan view, and integrating side portions of the sheet that extend along its longitudinal direction and overlap each other. When integrating the side portions, it is also possible to arrange a reinforcement material between the two sheets, or on an outer surface of one of the two sheets, and integrate the side portions of the sheets and the reinforcement material. A sheet for forming the tubular body can be produced from a raw material sheet by punching the raw material sheet into a predetermined shape.

Examples of the method for integrating sheets for forming the tubular body, that is, the method for forming the pair of side joint portions 24 include fusion bonding such as heat sealing or ultrasonic sealing, adhesion using an adhesive or the like, sewing, and the like.

The hair holder of the present invention is not limited to the foregoing embodiments, and appropriate changes can be made thereto without departing from the gist of the present invention.

For example, the surface of a sheet material that constitutes the "tubular body 2" may have protrusions and depressions formed through embossing or the like, or may be a flat surface.

The present invention further discloses the following hair holders and hair treatment methods using the same.

<1>

A hair holder including a tubular body which has: a first opening located at one end; and a second opening located at the other end, and which is configured to allow a lock of hair to be inserted from the first opening toward the second opening and to be capable of being rolled up, the tubular body having a longitudinal direction and a width direction that is orthogonal to the longitudinal direction,
- wherein the tubular body has two sheets that form outer surfaces, and
- at least one of the two sheets is formed of a color-changeable sheet that satisfies conditions (1) and (2) below:
- (1) an L* value in an L*a*b* color coordinate space is 90 or less; and
- (2) a color difference $\Delta E^*_{ab}$ value in the L*a*b* color coordinate space between before and after impregnation with a standard hair treatment agent is 1.0 or greater, the standard hair treatment agent containing ammonium thioglycolate in an amount of 6 mass %, ammonium hydrogencarbonate in an amount of 2 mass %, and disodium edetate in an amount of 0.5 mass %, the balance being water, and the standard hair treatment agent being adjusted to a pH of 8.4 at 20° C. using a 28 mass % aqueous solution of ammonia.

<2>

The hair holder as set forth in clause <1>, wherein the color difference $\Delta E^*_{ab}$ value of the color-changeable sheet in the L*a*b* color coordinate space between before and after impregnation with the standard hair treatment agent is 1.0 or greater, preferably 1.3 or greater, and more preferably 2.0 or greater, is 90.0 or less, preferably 15.0 or less, and more preferably 10.0 or less, and is from 1.0 to 90.0, preferably from 1.3 to 15.0, and more preferably from 2.0 to 10.0.

<3>

The hair holder as set forth in clause <1> or <2>, wherein the absolute value of a lightness difference ΔL* value of the color-changeable sheet is 1.0 or greater, the lightness difference ΔL* value being obtained by subtracting an $L^*_1$ value in the L*a*b* color coordinate space before impregnation with the standard hair treatment agent from an $L^*_2$ value in the L*a*b* color coordinate space after impregnation with the standard hair treatment agent.

<4>

The hair holder as set forth in clause <3>, wherein the absolute value of the lightness difference ΔL* value of the color-changeable sheet is 1.0 or greater, and preferably 2.0 or greater, is 90.0 or less, preferably 10.0 or less, and more preferably 5.0 or less, and is from 1.0 to 90.0, preferably from 2.0 to 10.0, and more preferably from 2.0 to 5.0.

<5>

The hair holder as set forth in clause <3> or <4>, wherein the lightness difference ΔL* value of the color-changeable sheet is −1.0 or less.

<6>

The hair holder as set forth in any one of clauses <3> to <5>, wherein the lightness difference ΔL* value of the color-changeable sheet is −10.0 or greater, and preferably −5.0 or greater, is −1.0 or less, and preferably −2.0 or less, and is from −10.0 to −1.0, and preferably from −5.0 to −2.0.

<7>

The hair holder as set forth in any one of clauses <1> to <6>, wherein a color difference Δb* value of the color-changeable sheet is 1.0 or greater, the color difference Δb* value of the color-changeable sheet being obtained by subtracting a $b^*_1$ value in the L*a*b* color coordinate space before impregnation with the standard hair treatment agent from a $b^*_2$ value in the L*a*b* color coordinate space after impregnation with the standard hair treatment agent.

<8>

The hair holder as set forth in clause <7>, wherein the color difference Δb* value of the color-changeable sheet is 1.0 or greater, and preferably 1.5 or greater, is 50.0 or less, and preferably 10.0 or less, and is from 1.0 to 50.0, and preferably from 1.5 to 10.0.

<9>

The hair holder as set forth in any one of clauses <1> to <6>, wherein a color difference Δb* value of the color-changeable sheet is less than 0, the color difference Δb* value of the color-changeable sheet being obtained by subtracting a $b^*_1$ value in the L*a*b* color coordinate space before impregnation with the standard hair treatment agent from a $b^*_2$ value in the L*a*b* color coordinate space after impregnation with the standard hair treatment agent.

<10>

The hair holder as set forth in clause <9>, wherein the color difference Δb* value of the color-changeable sheet is −50 or greater, and preferably −10 or greater, is less than 0, and preferably −0.5 or less, and is −50 or greater and less than −0, and preferably from −10 to −0.5.

<11>

The hair holder as set forth in any one of clauses <1> to <10>, wherein a color difference $\Delta E^*_{ab}$ value of the color-changeable sheet in the L*a*b* color coordinate space between before and after impregnation with water is less than 1.0, preferably 0.9 or less, and more preferably 0.5 or less.

<12>

The hair holder as set forth in any one of clauses <1> to <11>, wherein a color of the color-changeable sheet is black, gold, yellow, brown, silver, gray, pale crimson, crimson, yellow-green, dark blue, or dark gray, preferably black, gold, yellow, silver, gray, pale crimson, crimson, yellow-green, dark blue, or dark gray, and more preferably black, gold, yellow, silver, dark blue, or dark gray.

<13>

The hair holder as set forth in any one of clauses <1> to <12>, wherein the tubular body has a first surface sheet and a second surface sheet as the two sheets, and when the tubular body is rolled up, the first surface sheet is located on the inside of the tubular body and the second surface sheet is located on the outside of the tubular body, and at least the second surface sheet is formed of the color-changeable sheet.

<14>

The hair holder as set forth in clause <13>, wherein both the first surface sheet and the second surface sheet are formed of the color-changeable sheet.

<15>

The hair holder as set forth in clause <13> or <14>, wherein the second surface sheet has a plurality of slits that extend in the width direction and that are intermittently arranged along the longitudinal direction.

<16>

The hair holder as set forth in clause <15>, wherein the slit has, in the width direction, a first widthwise end portion, a second widthwise end portion and a straight portion located in the middle of the slit, both the first end portion and the second end portion have a greater length in the longitudinal direction than the straight portion, and the slit has circular portions at both the first and second end portions.

<17>

The hair holder as set forth in any one of clauses <1> to <16>, wherein the tubular body has a pair of side joint portions where the two sheets are joined to each other, and a tubular portion which is located between the pair of side joint portions and into which the lock of hair can be inserted, and the hair holder includes a reinforcement material at a position that overlaps the side joint portions.

<18>

The hair holder as set forth in clause <17>, wherein the tubular body has a first surface sheet and a second surface sheet as the two sheets, and when the tubular body is rolled up, the first surface sheet is located on the inside and the second surface sheet is located on the outside, and the reinforcement material is disposed on an outer surface of the second surface sheet.

<19>

The hair holder as set forth in any one of clauses <1> to <18>, including winding and tightening tabs on opposite side edge portions, respectively, of the tubular body, the side edge portions extending in the longitudinal direction.

<20>

The hair holder as set forth in any one of clauses <1> to <19>, wherein either one or both of the two sheets are formed of a shape-memory sheet that has been made to retain a state in which the hair holder is rolled up.

<21>

The hair holder as set forth in any one of clauses <1> to <20>, including: a fixing member that maintains a state in which the tubular body is rolled up; a first surface sheet and a second surface sheet as the two sheets, and when the tubular body is rolled up, the first surface sheet being located on the inside of the tubular body and the second surface sheet being located on the outside of the tubular body; and an extended portion that is constituted by the first surface sheet extending longitudinally outward from the tubular body,
  wherein the fixing member is formed on an outer surface of the extended portion.
<22>
The hair holder as set forth in clause <21>, wherein the extended portion is formed of the color-changeable sheet.
<23>
The hair holder as set forth in any one of clauses <1> to <22>, wherein the tubular body has a first surface sheet and a second surface sheet as the two sheets, and when the tubular body is rolled up, the first surface sheet is located on the inside of the tubular body and the second surface sheet is located on the outside of the tubular body, and
  the second surface sheet has a higher porosity in sheet than the first surface sheet.
<24>
The hair holder as set forth in any one of clauses <1> to <23>, wherein the tubular body has a first surface sheet and a second surface sheet as the two sheets, and when the tubular body is rolled up, the first surface sheet is located on the inside of the tubular body and the second surface sheet is located on the outside of the tubular body, and
  the second surface sheet has higher liquid diffusivity than the first surface sheet.
<25>
The hair holder as set forth in any one of clauses <1> to <24>, wherein the tubular body has a first surface sheet and a second surface sheet as the two sheets, and when the tubular body is rolled up, the first surface sheet is located on the inside of the tubular body and the second surface sheet is located on the outside of the tubular body, and
  the second surface sheet has higher liquid permeability than the first surface sheet.
<26>
A hair treatment method using the hair holder as set forth in any one of clauses <1> to <25>,
  the method including: an insertion step of inserting the lock of hair into the tubular body; a rolling up step of rolling up the tubular body together with the lock of hair inserted in the tubular body, thereby forming a lock-of-hair holding body in which the lock of hair is held in a deformed state; and a curling treatment step of performing a curling treatment on the lock of hair by supplying a hair treatment agent to the lock-of-hair holding body,
  wherein, in the curling treatment step, the supply of the hair treatment agent is performed while checking a visual change occurring in the color-changeable sheet.

EXAMPLES

Hereinafter, the present invention will be described in greater detail using examples. However, the scope of the present invention is not limited to the examples below.

Examples 1 to 11 and Comparative Example 1

A nonwoven fabric obtained through spun-bonding was prepared as a sheet constituting a tubular body. The nonwoven fabric was made using polyethylene terephthalate as raw material fibers. Sheets prepared for Examples 1 to 11 and Comparative Example 1 assumed respective colors shown in Table 1 below due to color materials kneaded into a resin constituting the raw material fibers. The colors shown in Table 1 below were colors before impregnation with a standard hair treatment agent and could be visually perceived. "NEOMASTER" (trade name) color materials available from NIHONKASEI Co., Ltd. were used as the color materials. In Comparative Example 1, the sheet constituting the tubular body was prepared without using a color material. The sheet of Comparative Example 1 was white.

For the sheets that had been obtained in the above-described manner, the $L^*$ value, the $a^*$ value, and the $b^*$ value were measured before and after impregnation with the standard hair treatment agent using a similar method to that described in the section "Method for Measuring $L^*$, $a^*$, and $b^*$ Values" above, and the color difference $\Delta E^*_{ab}$ value, the lightness difference $\Delta L^*$ value, and the color difference $\Delta b^*$ value in the above-described $L^*a^*b^*$ color coordinate space were obtained. Table 1 below shows the measurement results.

Evaluation of Visibility of Visual Change in Sheets

The visibility of a visual change in each sheet before and after the impregnation with the standard hair treatment agent was evaluated by five expert panelists. Specifically, changes in the colors of the sheets before and after the impregnation with the standard hair treatment agent were scored in such a manner that an easily visible change was given 3 points, a visible change was given 2 points, and a hardly visible change was given 1 point, and then, based on average values of the scores, evaluations were made using the following criteria. Table 1 below shows the evaluation results.
A: The average value was from 2.5 to 3.
B: The average value was 2.0 or greater and less than 2.5.
C: The average value was 1.0 or greater and less than 2.0.

TABLE 1

| | | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Com. Ex. 1 |
|---|---|---|---|---|---|---|---|---|---|---|---|---|---|
| Color of sheet that constitutes tubular body | | Black | Gold | Yellow | Brown | Silver | Gray | Pale crimson | Crimson | Yellow-green | Dark blue | Dark gray | White |
| Measurement value before impregnation with standard hair treatment agent | $L^*_1$ value | 31.41 | 73.36 | 80.68 | 47.76 | 80.46 | 52.03 | 71.13 | 54.11 | 63.95 | 40.63 | 45.09 | 92.35 |
| | $a^*_1$ value | 0.47 | 16.29 | 15.39 | 17.15 | −0.33 | 0.55 | 33.93 | 32.11 | −18.04 | −2.89 | −0.26 | 0.12 |
| | $b^*_1$ value | 1.18 | 41.02 | 81 | 29.44 | −0.31 | 2.12 | 0.49 | −3.94 | 50.98 | −13.57 | −6.1 | 0.67 |
| Difference between measurement values before and after impregnation with standard hair treatment agent | $\Delta E^*_{ab}$ value | 4.67 | 2.3 | 3.15 | 3.49 | 2.63 | 1.5 | 1.93 | 1.42 | 2.49 | 3.01 | 3.21 | 0.82 |
| | $\Delta L^*$ value | −4.63 | −1.37 | −0.39 | −3.3 | −2.63 | −1.74 | −0.97 | −0.73 | −1.88 | −2.91 | −3.11 | −0.68 |
| | $\Delta b^*$ value | −0.64 | 1.85 | 3.03 | 0.4 | −0.1 | −0.27 | 1.26 | 1.17 | 1.42 | −1.12 | −0.46 | 0.46 |

TABLE 1-continued

| | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Com. Ex. 1 |
|---|---|---|---|---|---|---|---|---|---|---|---|---|
| Visibility of visual change in sheet | A | A | A | A | A | B | B | B | A | A | A | C |

It can be seen from the results shown in Table 1 that the changes in the colors of the sheets of Examples 1 to 11 between before and after the impregnation with the standard hair treatment agent were easier to perceive, compared with that of the sheet of Comparative Example 1. That is to say, with the sheets of Examples 1 to 11, whether or not discoloration of the sheet has occurred can be expected to be usable as a basis for judgment of whether or not a hair treatment agent has been applied to a lock of hair held in a tubular body of a hair holder.

INDUSTRIAL APPLICABILITY

According to the present invention, it is possible to easily confirm that a hair treatment agent such as a permanent wave agent has been applied to a lock of hair held in a tubular body of a hair holder.

The invention claimed is:

1. A hair holder including a tubular body which has: a first opening located at one end; and a second opening located at the other end, and which is configured to allow a lock of hair to be inserted from the first opening toward the second opening and to be capable of being rolled up, the tubular body having a longitudinal direction and a width direction that is orthogonal to the longitudinal direction,
   wherein the tubular body has two sheets that form outer surfaces, and
   at least one of the two sheets is formed of a color-changeable sheet that satisfies conditions (1) and (2) below:
   (1) an $L^*$ value in an $L^*a^*b^*$ color coordinate space is 90 or less; and
   (2) a color difference $\Delta E^*ab$ value in the $L^*a^*b^*$ color coordinate space between before and after impregnation with a standard hair treatment agent is 1.0 or greater, the standard hair treatment agent containing ammonium thioglycolate in an amount of 6 mass %, ammonium hydrogencarbonate in an amount of 2 mass %, and disodium edetate in an amount of 0.5 mass %, the balance being water, and the standard hair treatment agent being adjusted to a pH of 8.4 at 20° C. using a 28 mass % aqueous solution of ammonia, and
   wherein said color-changeable sheet contains therein a color material that is kneaded into a resin that constitutes raw material fibers of said color changeable sheet, and wherein the color material contains an acid-base indicator, a dye, a pigment or a combination thereof.

2. The hair holder according to claim 1, wherein the tubular body has a first surface sheet and a second surface sheet as the two sheets, and when the tubular body is rolled up, the first surface sheet is located on the inside of the tubular body and the second surface sheet is located on the outside of the tubular body, and
   the second surface sheet has a higher porosity of gaps in the sheet than the first surface sheet.

3. The hair holder according to claim 2, wherein the second surface sheet includes a slit, the gaps in the second surface sheet are gaps of a portion excluding the slit.

4. The hair holder according to claim 1, wherein the tubular body has a first surface sheet and a second surface sheet as the two sheets, and when the tubular body is rolled up, the first surface sheet is located on the inside of the tubular body and the second surface sheet is located on the outside of the tubular body, and
   the second surface sheet has higher liquid diffusivity than the first surface sheet.

5. The hair holder according to claim 1, wherein the color difference $\Delta E^*ab$ value of the color-changeable sheet in the $L^*a^*b^*$ color coordinate space between before and after impregnation with the standard hair treatment agent is from 1.0 to 90.0.

6. The hair holder according to claim 1, wherein the absolute value of a lightness difference $\Delta L^*$ value of the color-changeable sheet is 1.0 or greater, the lightness difference $\Delta L^*$ value being obtained by subtracting an $L^*_1$ value in the $L^*a^*b^*$ color coordinate space before impregnation with the standard hair treatment agent from an $L^*_2$ value in the $L^*a^*b^*$ color coordinate space after impregnation with the standard hair treatment agent.

7. The hair holder according to claim 6, wherein the lightness difference $\Delta L^*$ value of the color-changeable sheet is $-1.0$ or less.

8. The hair holder according to claim 1, wherein a color difference $\Delta b^*$ value of the color-changeable sheet is 1.0 or greater, the color difference $\Delta b^*$ value of the color-changeable sheet being obtained by subtracting a $b^*_1$ value in the $L^*a^*b^*$ color coordinate space before impregnation with the standard hair treatment agent from a $b^*_2$ value in the $L^*a^*b^*$ color coordinate space after impregnation with the standard hair treatment agent.

9. The hair holder according to claim 1, wherein a color difference $\Delta b^*$ value of the color-changeable sheet is less than 0, the color difference $\Delta b^*$ value of the color-changeable sheet being obtained by subtracting a $b^*_1$ value in the $L^*a^*b^*$ color coordinate space before impregnation with the standard hair treatment agent from a $b^*_2$ value in the $L^*a^*b^*$ color coordinate space after impregnation with the standard hair treatment agent.

10. The hair holder according to claim 1, wherein a color difference $\Delta E^*_{ab}$ value of the color-changeable sheet in the $L^*a^*b^*$ color coordinate space between before and after impregnation with water is less than 1.0.

11. The hair holder according to claim 1, wherein a color of the color-changeable sheet is black, gold, yellow, brown, silver, gray, pale crimson, crimson, yellow-green, dark blue, or dark gray.

12. The hair holder according to claim 1, wherein the tubular body has a first surface sheet and a second surface sheet as the two sheets, and when the tubular body is rolled up, the first surface sheet is located on the inside of the tubular body and the second surface sheet is located on the outside of the tubular body, and
   at least the second surface sheet is formed of the color-changeable sheet.

13. The hair holder according to claim 12, wherein both the first surface sheet and the second surface sheet are formed of the color-changeable sheet.

14. The hair holder according to claim 12, wherein the second surface sheet has a plurality of slits that extend in the width direction and that are intermittently arranged along the longitudinal direction.

15. The hair holder according to claim 1, wherein either one or both of the two sheets are formed of a shape-memory sheet that has been made to retain a state in which the hair holder is rolled up.

16. The hair holder according to claim 1, including: a fixing member that maintains a state in which the tubular body is rolled up; a first surface sheet and a second surface sheet as the two sheets, and when the tubular body is rolled up, the first surface sheet being located on the inside of the tubular body and the second surface sheet being located on the outside of the tubular body; and an extended portion that is constituted by the first surface sheet extending longitudinally outward from the tubular body, wherein the fixing member is formed on an outer surface of the extended portion.

17. The hair holder according to claim 16, wherein the extended portion is formed of the color-changeable sheet.

18. The hair holder according to claim 1, wherein the tubular body has a first surface sheet and a second surface sheet as the two sheets, and when the tubular body is rolled up, the first surface sheet is located on the inside of the tubular body and the second surface sheet is located on the outside of the tubular body, and the second surface sheet has higher liquid permeability than the first surface sheet.

19. The hair holder according to claim 1, wherein a discoloration of the color-changeable sheet is reversible.

20. The hair holder according to claim 2, wherein an index of refraction for light of the color-changeable sheet changes when gaps in the sheet are filled with the standard hair treatment agent.

* * * * *